US010648205B2

(12) United States Patent
Spencer (10) Patent No.: US 10,648,205 B2
(45) Date of Patent: May 12, 2020

(54) TONNEAU COVER WITH SLAM LATCH AND AUTOMATIC SECONDARY SLAM LATCH (71) Applicant: TruXedo, Inc., Yankton, SD (US)

(72) Inventor: Michael R. Spencer, Hubbard, NE (US)

(73) Assignee: TRUXEDO, INC., Yankton, SD (US)

( * ) Notice: Subject to any disclaimer, the term of this patent is extended or adjusted under 35 U.S.C. 154(b) by 248 days.

(21) Appl. No.: 15/487,126

(22) Filed: Apr. 13, 2017

(65) Prior Publication Data

US 2018/0297457 A1 Oct. 18, 2018

(51) Int. Cl.
B60J 7/19 (2006.01)
E05C 3/14 (2006.01)

(52) U.S. Cl.
CPC ............... E05C 3/14 (2013.01); B60J 7/198 (2013.01)

(58) Field of Classification Search
CPC ..... B60J 7/198; B60J 7/185; B60J 7/19; B60J 7/08; B60J 7/14; E05C 3/14
USPC .................................................... 296/100.07
See application file for complete search history.

(56) References Cited

U.S. PATENT DOCUMENTS

| 6,290,441 | B1* | 9/2001 | Rusu | B60P 7/0807 |
| | | | | 296/100.07 |
| 6,361,086 | B1* | 3/2002 | Robbins | B60J 7/198 |
| | | | | 292/158 |
| 8,029,029 | B2* | 10/2011 | Terhaar | E05B 81/14 |
| | | | | 292/216 |
| 9,827,839 | B2* | 11/2017 | Williamson | B60J 7/198 |
| 10,189,340 | B2* | 1/2019 | Schmeichel | B60J 7/198 |
| 2016/0200375 | A1* | 7/2016 | Kerr, III | B60J 7/141 |
| | | | | 296/100.07 |
| 2016/0355078 | A1* | 12/2016 | Williamson | B60J 7/198 |
| 2018/0111460 | A1* | 4/2018 | Xu | B60J 7/104 |
| 2018/0118004 | A1* | 5/2018 | Schmeichel | B60J 7/198 |
| 2018/0281572 | A1* | 10/2018 | Zichettello | B60J 7/068 |
| 2019/0001800 | A1* | 1/2019 | Williamson | B60J 7/141 |
| 2019/0193538 | A1* | 6/2019 | Carter | B60J 7/141 |

* cited by examiner

Primary Examiner — Hilary L Gutman
(74) Attorney, Agent, or Firm — William H. Honaker; Dickinson Wright PLLC (57) ABSTRACT A tonneau cover system for a vehicle having a cargo box and a tailgate movable between an open position and a closed position. The tonneau cover system includes a tonneau cover mountable to the vehicle and movable between deployed and open arrangements. In the deployed arrangement, the tonneau cover overlies the cargo box. In the open arrangement, the tonneau cover is opened for allowing access to the cargo box. A latch mechanism is movable between a locked position in which the latch mechanism secures the tonneau cover in the deployed arrangement, and an unlocked position in which the latch mechanism is released to allow movement of the tonneau cover into the open arrangement. The latch mechanism is biased in the unlocked position and comprises a tailgate contact positionable to engage the tailgate in the closed position to move the latch mechanism from the unlocked position to the locked position.

29 Claims, 10 Drawing Sheets

TONNEAU COVER WITH SLAM LATCH AND AUTOMATIC SECONDARY SLAM LATCH

FIELD

The present disclosure relates to a tonneau cover system for a vehicle having a cargo box.

BACKGROUND

This section provides background information related to the present disclosure, which is not necessarily prior art.

Vehicles including cargo beds, such as pickup trucks, are popular because they enable objects of various sizes to be placed in the bed for transportation. The bed generally has a floor surface that is bounded by a front wall, side walls, and a back wall, which is typically in the form of a tailgate. The tailgate is movable to facilitate placement of objects into and out of the bed.

A cover, such as a tonneau cover, can be used to enclose the bed, and to conceal or otherwise protect the contents thereof. In a closed or extended position, the tonneau cover extends across the bed, and a header portion of the tonneau cover is latched down proximate to the tailgate. In an open or stowed position, the cover is removed or opened to generally expose at least a portion of the bed and permit access to the contents thereof. To open the tonneau cover, the header is unlatched by actuating both a driver's side latch mechanism. Some tonneau covers have a passenger's side latch mechanism, which can provide added security. Such a passenger's side latch mechanism must be manually unlatched, which is inconvenient.

While such current tonneau covers are suitable for their intended use, they are subject to improvement. For example and with respect to tonneau covers that have latch mechanisms on both the driver's side and the passenger's side, requiring a driver to manually unlatch both a driver's side latch mechanism and a passenger's side latch mechanism is inconvenient and time consuming: the driver must unlatch the driver's side latch mechanism and then walk to the other side of the vehicle to unlatch the passenger's side latch mechanism, for example. The present teachings advantageously provide for an improved tonneau cover system that eliminates the need to individually unlatch both a driver's side latch mechanism and a passenger's side latch mechanism. As a result, the tonneau cover can be unlatched and opened easily and quickly. The present teachings provide for numerous additional advantages and unexpected results, as described herein and as one skilled in the art will recognize.

SUMMARY

This section provides a general summary of the disclosure, and is not a comprehensive disclosure of its full scope or all of its features.

The present teachings include a tonneau cover system for a vehicle having a cargo box and a tailgate movable between an open position and a closed position. The tonneau cover system includes a tonneau cover mountable to the vehicle and movable between a deployed arrangement and an open arrangement. In the deployed arrangement the tonneau cover overlies the cargo box. In the open arrangement the tonneau cover is opened for allowing access to the cargo box. A latch mechanism is mountable onto the vehicle and is movable between a locked position, in which the latch mechanism secures the tonneau cover in the deployed arrangement, and an unlocked position in which the latch mechanism is released to allow movement of the tonneau cover into the open arrangement. The latch mechanism is biased in the unlocked position and comprises a tailgate contact positionable to engage the tailgate in the closed position to move the latch mechanism from the unlocked position to the locked position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
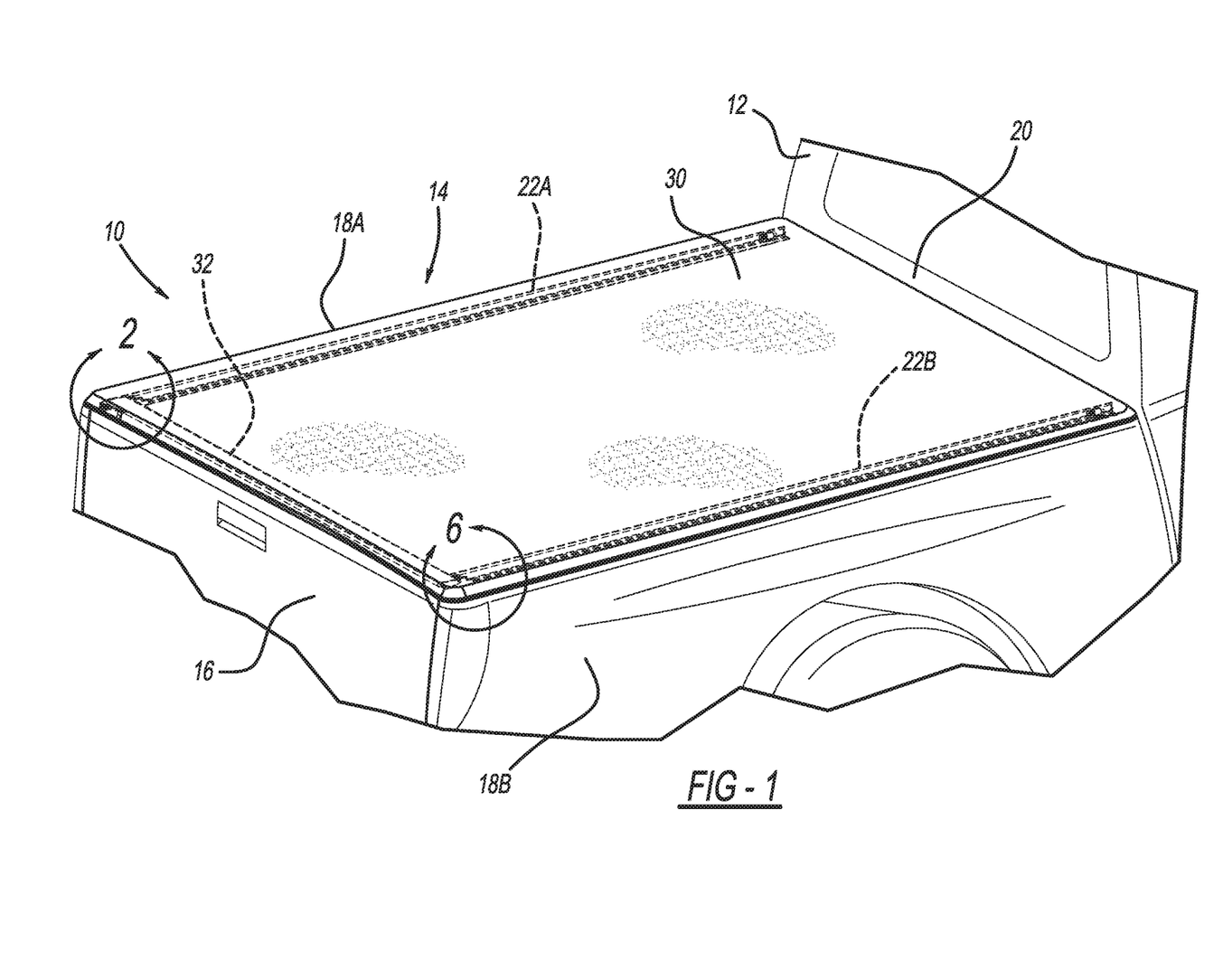
FIG. 1 is a perspective view of a tonneau cover system according to the present teachings included with an exemplary vehicle.
Figure 2:
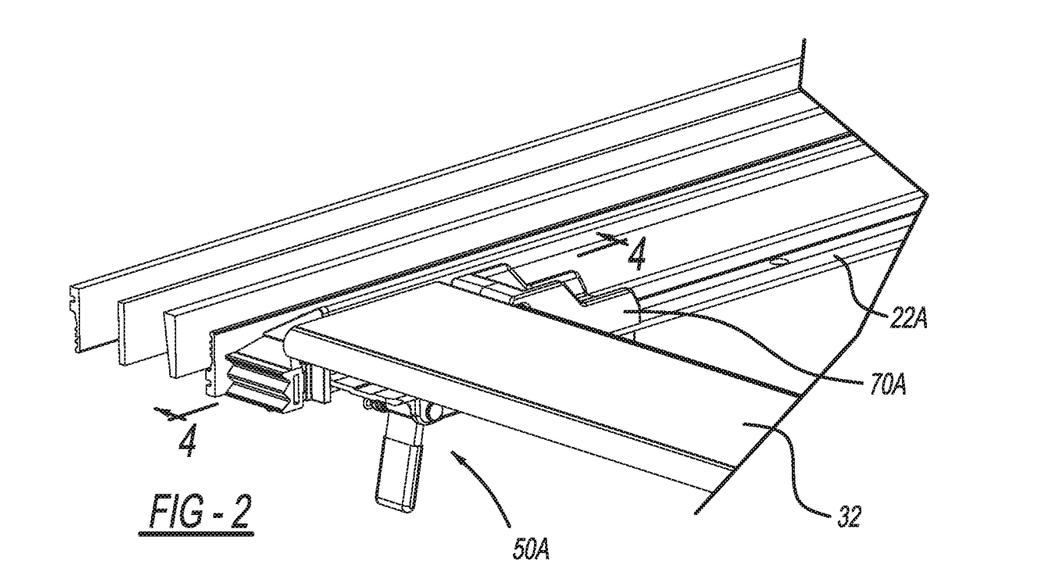
FIG. 2 illustrates area 2 of FIG. 1.

FIG. 1 illustrates a tonneau cover system 10 in accordance with the present teachings for a vehicle 12. The vehicle 12 has a cargo box 14 and a tailgate 16 movable between an open position and a closed position. Although the vehicle 12 is illustrated as a pickup truck, the tonneau cover system 10 can be used with any suitable vehicle including a cargo box and a tailgate.

The cargo box 14 is defined by a first sidewall 18A at a driver's side of the vehicle 12, and a second sidewall 18B at a passenger's side of the vehicle 12. The first and second sidewalls 18A and 18B extend generally parallel to one another from the tailgate 16 to a front end 20 of the sidewall 18A. Extending along the first sidewall 18A is a first rail 22A, and extending along the second sidewall 18B is a second rail 22B.

The first and second rails 22A and 22B support tonneau cover 30 over the cargo box 14. The tonneau cover 30 is movable between a deployed arrangement (illustrated in FIG. 1) in which the tonneau cover 30 overlies the cargo box, and an open arrangement in which the tonneau cover 30 is rolled over the cargo box 14 from the closed position to the open position to allow access to the cargo box 14. The tonneau cover 30 includes a header 32, which is latched to the first and second rails 22A and 22B proximate to the tailgate 16 when the tonneau cover 30 is locked in the deployed arrangement illustrated in FIG. 1. The tonneau cover 30 can be any suitable type of tonneau cover, such as a flexible rollup tonneau cover, a retractable tonneau cover, as well as a soft or hard tri-fold tonneau cover.

With continued reference to FIG. 1, and additional reference to FIGS. 2-5, the tonneau cover system 10 includes a latch mechanism 50A mounted to the first rail 22A for latching the header 32 onto the first rail 22A when the tonneau cover 30 is in the deployed arrangement of FIG. 1. The latch mechanism 50A generally includes a frame 52A, which is secured to an undersurface of the first rail 22A. The latch mechanism 50A further includes a latch element 54A having a lever portion 56A and a hook portion 58A. The latch element 54A is rotatably coupled to the frame 52A in any suitable manner, such as with a pin 60A. The latch element 54A pivots about the pin 60A when the lever portion 56A is actuated. To facilitate actuation of the latch element 54A, the lever portion 56A can be covered with a cap 62A, which can be made of any suitable material to facilitate grasping of the lever portion 56A. The hook portion 58A is arranged such that it extends through an opening 24A defined by the first rail 22A.

Figure 3:
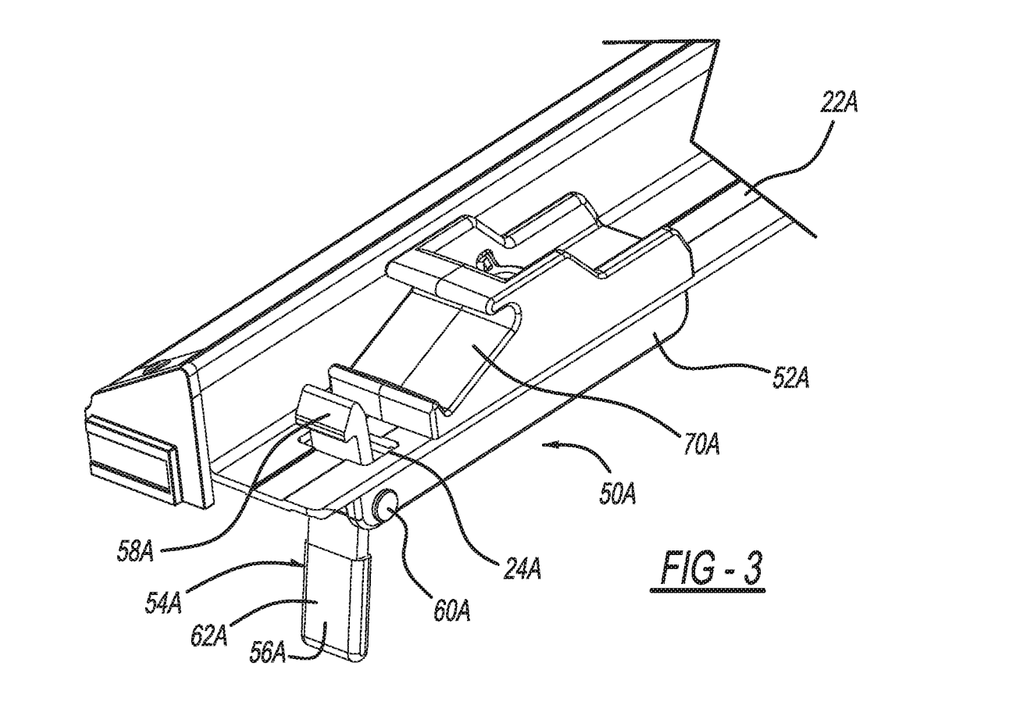
FIG. 3 is similar to FIG. 2, but with a tonneau cover header of FIG. 2 removed.
Figure 4:
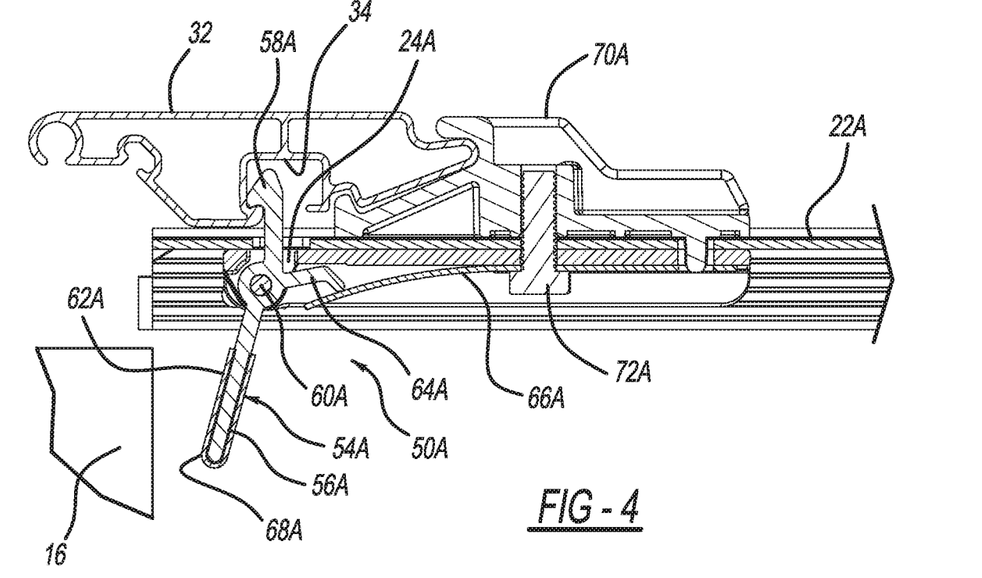
FIG. 4 is a cross-sectional view taken along line 4-4 of FIG. 2 illustrating a latch mechanism in a locked position.
Figure 5:
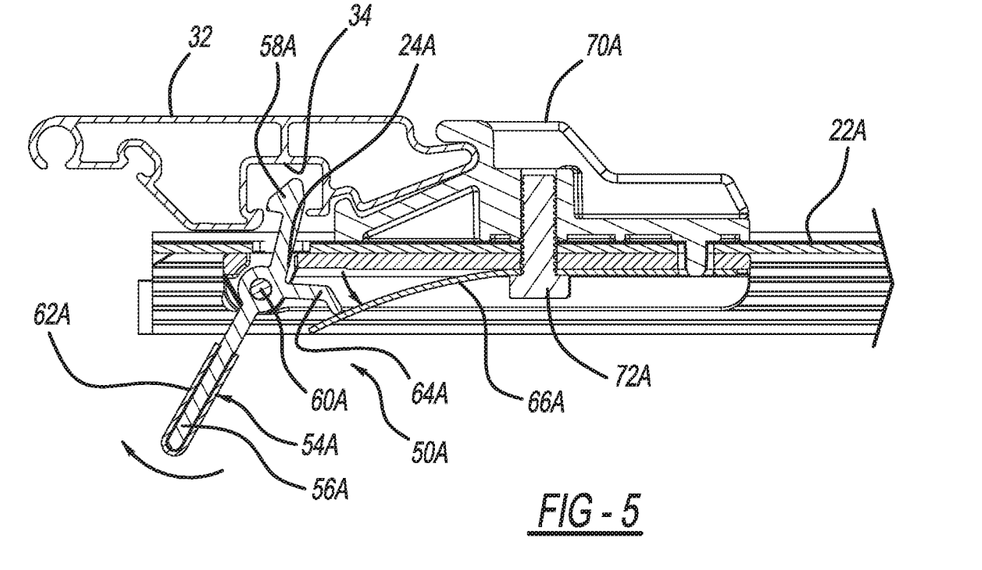
FIG. 5 is a cross-sectional view illustrating the latch mechanism of FIG. 4 in an unlocked position.

As illustrated in FIGS. 4 and 5, the latch element 54A further includes a tab 64A between the lever portion 56A and the hook portion 58A. Abutting the tab 64A is a spring 66A. The spring 66A can be secured in position by the coupling member 72A, or in any other suitable manner. The spring 66A is flexible and arranged to apply force against the tab 64A to bias the latch element 54A in a locked position, which is illustrated in FIGS. 3 and 4 for example. The tab 64A can be biased in the locked position of FIGS. 3 and 4 in any other suitable manner as well.

Coupled to an upper surface of the first rail 22A opposite to the frame 52A is a header stop 70A. The header stop 70A can be coupled to the first rail 22A in any suitable manner, such as with coupling member 72A illustrated in FIGS. 4 and 5. The coupling member 72A can be inserted through the frame 52A, the first rail 22A, and the header stop 70A to secure both the frame 52A and the header stop 70A to the first rail 22A. The header stop 70A is configured to receive the header 32 in order to retain the tonneau cover 30 in the deployed arrangement of FIG. 1. The header stop 70A is optional, and may not be used with all types of tonneau covers that the present teachings are applicable to. For example, when the present teachings include a retractable tonneau cover or a tri-fold tonneau cover, the header stop 70A will typically not be used.

The header 32 is locked and clamped down onto the first rail 22A by the latch element 54A. Specifically, the hook portion 58A is received within a receptacle 34 defined by the header 32, where the hook portion 58A hooks onto the header 32 when the latch element 54A is arranged in the locked position of FIGS. 3 and 4. The latch element 54A is biased in the locked position by the spring 66A, and thus the latch element 54A remains in the locked position even after the tailgate 16 is opened. When the tailgate 16 is closed, as is illustrated in FIG. 4, the lever portion 56A of the latch element 54A is inaccessible, which prohibits rotation of the latch element 54A from the locked position of FIGS. 3 and 4 to an unlocked position as illustrated in FIG. 5. When the tailgate 16 is rotated to an open position so that the lever portion 56A no longer abuts the tailgate 16, the latch element 54A can be rotated to the unlocked position of FIG. 5, such as by grasping the lever portion 56A and pulling the lever portion away from the front end 20 of the cargo box 14. Rotating the latch element 54A to the unlocked position of FIG. 5 unhooks the hooked portion 58A from the header 32, thereby allowing the header 32 to be raised off of the first rail 22A and decoupled from the header stop 70A, and allowing the tonneau cover 30 to be moved from the deployed arrangement of FIG. 1 to an open arrangement in order to allow access to the cargo box 14.

After the latch element 54A has been rotated to the unlocked position of FIG. 5 and released, the spring 66A will apply force to the tab 64A to return the latch element 54A to the locked position. With the latch element 54A in the locked position, the header 32 can be slammed down onto the hook portion 58A to again secure the tonneau cover 30 in the deployed arrangement of FIG. 1.

Figure 6:
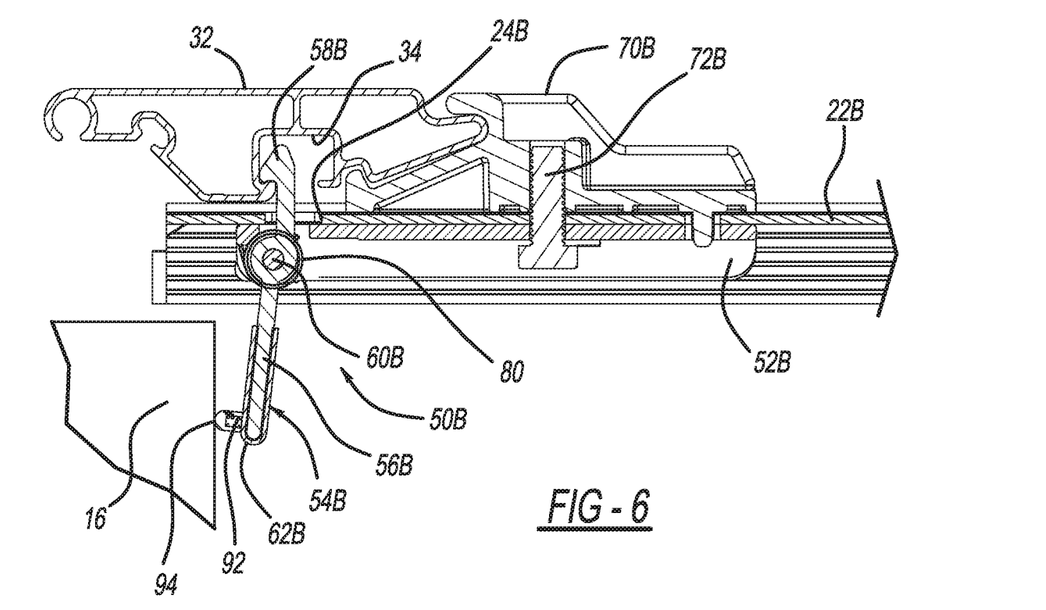
FIG. 6 is a cross-sectional view of area 6 of FIG. 1 including a latch mechanism according to the present teachings in a locked position.
Figure 7:
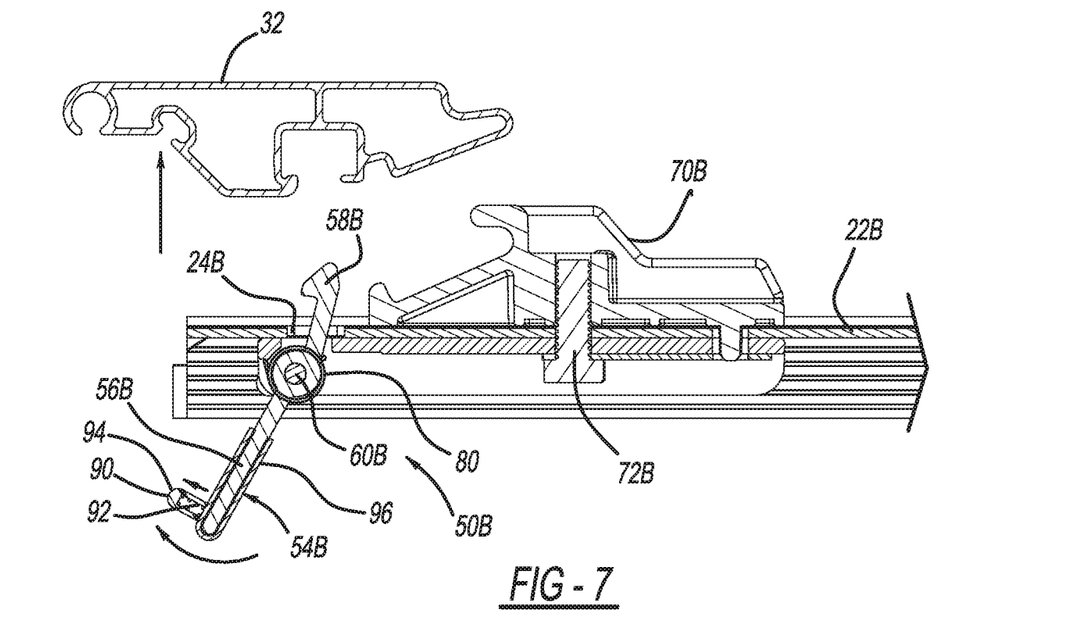
FIG. 7 is a cross-sectional view of the latch mechanism of FIG. 6 in an unlocked position.

With reference to FIGS. 6 and 7, a passenger side latch mechanism in accordance with the present teachings is illustrated at reference numeral 50B. The latch mechanism 50B is mounted to the second rail 22B. Unlike the latch mechanism 50A, the latch mechanism 50B is an automatic latch mechanism that automatically moves from the locked position of FIG. 6 to an unlocked position illustrated in FIG. 7 when the tailgate 16 is opened.

The latch mechanism 50B includes a frame 52B, which is similar to, or the same is, the frame 52A, and thus the description of the frame 52A also applies to the frame 52B. The frame 52B is mounted to an undersurface of a second rail 22B in a suitable manner, such as with coupling member 72B, which can be substantially similar to, or the same as, the coupling member 72A. Mounted to an upper surface of the second rail 22B opposite to the frame 52B is a header stop 70B, which is substantially to, or the same as, the header stop 70A. Thus the description of the header stop 70A also applies to the header stop 70B.

Rotatably coupled to the frame 52B is a latch element 54B. The latch element 54B includes a lever portion 56B and a hook portion 58B. The latch element 54B is pivotally mounted to the frame 52B in any suitable manner, such as with a pin 60B. The hook portion 58B is arranged such that it extends through an opening 24B defined in the second rail 22B. The latch element 54B is pivotally movable between a locked position illustrated in FIG. 6 and an unlocked position illustrated in FIG. 7. The latch element 54B is biased in the unlocked position of FIG. 7 with any suitable biasing member, such as spring 80. When the latch element 54B is in the locked position of FIG. 6 and the header 32 is received by the header stop 70B, the hook portion 58B is arranged within the receptacle 34 of the header 32 in order to latch the header 32 down onto the second rail 22B and retain the tonneau cover 30 in the deployed arrangement of FIG. 1.

The latch element 54B is retained in the locked position of FIG. 6 by the tailgate 16. Specifically, the latch element 54B further includes a head 90, which is supported on the lever portion 56B by a spring 92. The spring 92 is mounted to the lever portion 56B in any suitable manner. For example, the spring 92 and/or the head 90 may be integral with a connection member or sleeve 96, which is coupled to the lever portion 56B in any suitable manner, such as with an adhesive, press fit, etc.

The head 90 provides a tailgate contact 94. When the tailgate 16 is closed, as illustrated in FIG. 6, the tailgate 16 contacts the tailgate contact 94 in order to hold and maintain the latch element 54B in the locked position of FIG. 6. When the tailgate 16 is opened, the latch element 54B is rotated to the unlocked position of FIG. 7 by the biasing member 80 because the tailgate 16 is no longer positioned to contact the tailgate contact 94 and maintain the latch element 54B in the locked position of FIG. 6. The latch element 54B is thus an automatic latch element that will automatically rotate to the unlocked position of FIG. 7 when the tailgate 16 is opened, which advantageously eliminates the need for the driver to manually actuate both the lever portion 56A and the lever portion 56B to their respective unlocked positions.

To unlatch the tonneau cover 30 and remove the tonneau cover 30 from the deployed position of FIG. 1 to an open position, the driver need only perform the following simplified steps: open the tailgate 16, which will result in the latch element 54B automatically rotating from the locked position of FIG. 6 to the unlocked position of FIG. 7; and manually actuate the latch mechanism 50A at the first rail 22A in order to move the latch mechanism 50A from the locked position of FIG. 4 to the unlocked position of FIG. 5, thereby unlatching the header 32 at the driver's side first rail 22A.

Figure 8:
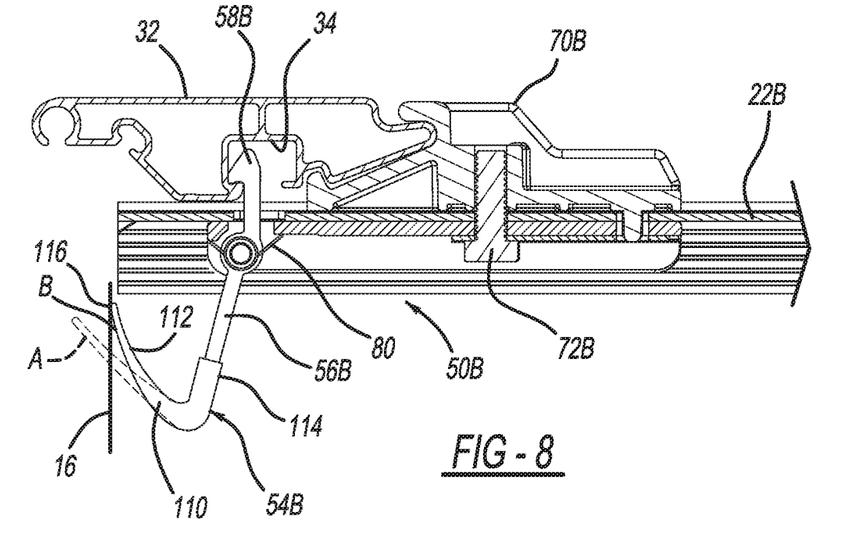
FIG. 8 is a cross-sectional view of another latch mechanism according to the present teachings in a locked position.

With reference to FIG. 8, the latch element 54B can include a flexible tab 110 in place of the head 90 and spring 92. Specifically, the flexible tab 110 includes an extended portion 112 and a connection or sleeve portion 114. The connection portion 114 is connected to the lever portion 56B in any suitable manner, such as with any suitable adhesive or press-fit connection. Alternatively, the connection portion 114 may be coextruded with the lever portion 56B. Extending from the connection portion 114 is the extended portion 112, which is flexible. In relaxed position A, the extended portion 112 is generally linear. When the extended portion 112 abuts the tailgate 16, the extended portion 112 flexes to flexed position B and contacts the tailgate 16 at tailgate contact 116, which is generally at or proximate to a distal end of the extended portion 112. Thus when the tailgate 16 is closed, the tailgate 16 abuts the extended portion 112 and flexes the extended portion 112 to flexed position B, and rotates the latch element 54B to the locked position of FIG. 8, in which the hook portion 58B is latched onto the header 32. When the tailgate 16 is opened, the tailgate 16 will no longer abut the flexible tab 110, which will allow the latch element 54B to rotate to the unlocked position by the biasing member 80, and no longer engage the header 32.

Figure 9:
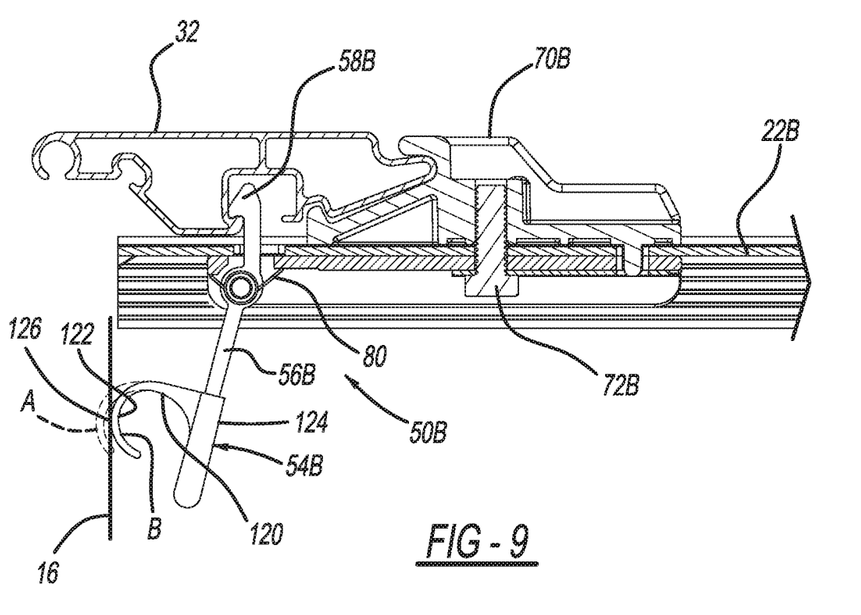
FIG. 9 is a cross-sectional view of an additional latch mechanism according to the present teachings in a locked position.

With reference to FIG. 9, instead of the flexible tab 110, the latch element 54B can include a flexible tab 120, which is generally curved. The flexible tab 120 includes an extended portion 122, which is generally shaped as a hook, and a connection or sleeve portion 124. The connection/sleeve portion 124 is connected to the lever portion 56B in any suitable manner, such as with a press-fit and/or an adhesive. Alternatively, the connection/sleeve portion 124 may be coextruded with the lever portion 56B. When the tailgate 16 is closed, the extended portion 122 contacts the tailgate 16 and is flexed by the tailgate 16 from relaxed position A to flexed position B. The tailgate 16 retains the latch element 54A in the locked position of FIG. 9 as long as the tailgate 16 is closed. When the tailgate 16 is opened, the tailgate 16 will no longer contact the extended portion 122. As a result, the biasing member 80 will rotate the latch element 54B to the unlocked position to automatically unlatch the header from the second rail 22B on the passenger side of the vehicle 12.

Figure 10:
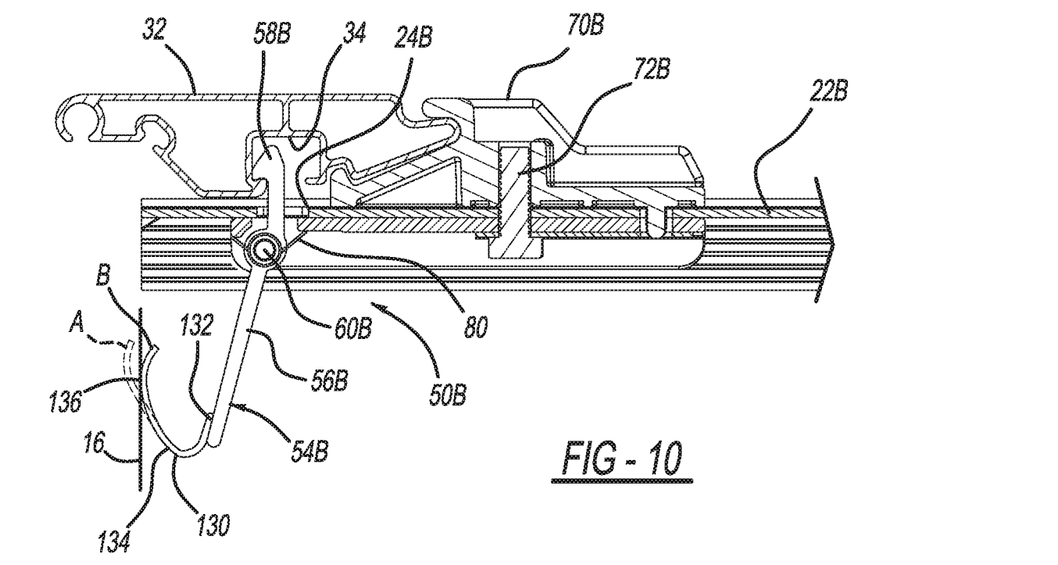
FIG. 10 is a cross-sectional view of yet another latch mechanism according to the present teachings in a locked position.

With reference to FIG. 10, the latch element 54B can include a flexible tab 130 having a base portion 132 and an extended portion 134. The base portion 132 is secured to the lever portion 56A in any suitable manner, such as with any suitable adhesive. The extended portion 134 is flexible between a relaxed position A and a flexed position B. As the tailgate 16 is closed, the tailgate 16 will contact the extended portion 134 at tailgate contact 136, which is generally at a distal end of the extended portion 134. The tailgate 16 flexes the extended portion 134 from relaxed position A to flexed position B, and rotates the lever portion 56B from the unlocked position (which the latch element 54B is biased in by the biasing member 80) to the locked position of FIG. 10. In the locked position of FIG. 10 the latch element 54B latches onto the header 32 in order to latch the header 32 onto the second rail 22B. When the tailgate 16 is opened, the tailgate 16 no longer contacts the flexible tab 130, which allows the latch element 54B to be rotated to the unlocked position by the biasing member 80, which automatically unlatches the latch element 54B from the header 32.

Figure 11:
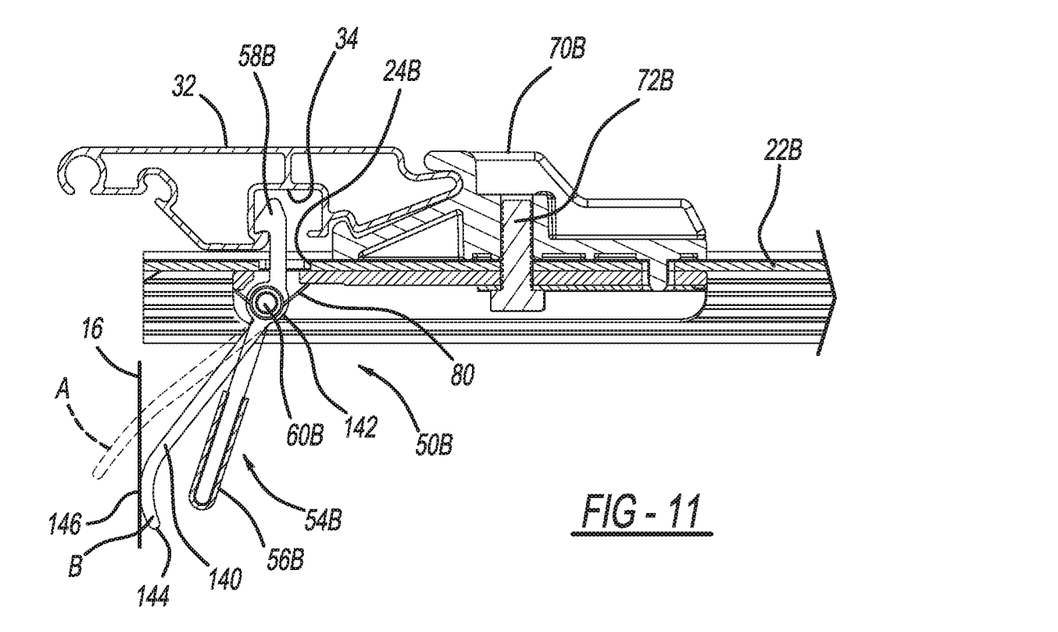
FIG. 11 is a cross-sectional view of still another latch mechanism according to the present teachings in a locked position.

With reference to FIG. 11, the latch element 54B can include a toggle 140, such as a polymeric toggle. The toggle 140 extends from a hub 142 of the latch element 54B. The toggle 140 is positioned such that when the tailgate 16 is closed, the tailgate 16 contacts a distal end 144 of the toggle 140 at tailgate contact 146. The toggle 140 is flexible, and is flexed from relaxed position A to flexed position B. Specifically, as the tailgate 16 is closed, it contacts the toggle 140 at tailgate contact 146, flexes the toggle 140 to the flexed position B, and rotates the latch element 54B to the locked position of FIG. 11 in which the hook portion 58B latches onto the header 32 to latch the header down onto the second rail 22B.

Figure 12:
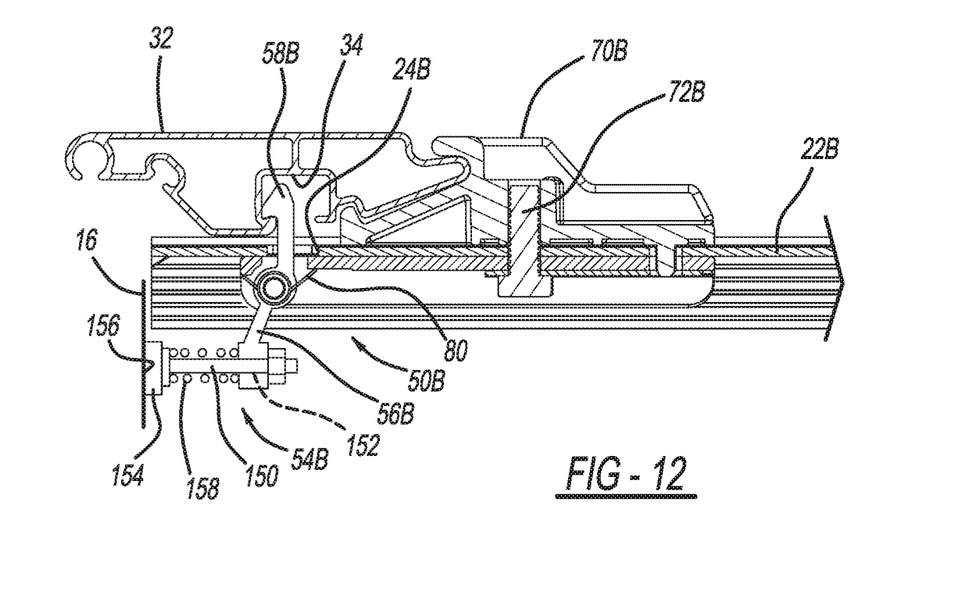
FIG. 12 is a cross-sectional view of an additional latch mechanism according to the present teachings in a locked position.

With reference to FIG. 12, the latch element 54B can include a plunger 150 received within an aperture 152 of the lever portion 56B, which can be shortened. The plunger 150 includes a distal end 154, which is arranged to contact the tailgate 16 at tailgate contact 156 of the distal end 154 when the tailgate 16 is closed. A spring 158 biases the plunger 150 in an outward/extended position in order to facilitate contact with the tailgate 16 at the tailgate contact 156 of the distal end 154. Thus as the tailgate 16 is closed, the tailgate 16 contacts the distal end 154 of the plunger 150 at tailgate contact 156 and at least partially compresses the spring 158, which causes the latch element 54B to rotate to the locked position of FIG. 12, in which the hook portion 58B latches onto the header 32. When the tailgate 16 is opened, the tailgate 16 will disengage the plunger 150. With the plunger 150 no longer engaged by the tailgate 16, the spring 158 will extend the plunger 150 further outward from the lever portion 56B, and the biasing member 80 will rotate the latch element 54B from the locked position of FIG. 12 to the unlocked position, in which the hook portion 58B will no longer latch onto the header 32.

Figure 13:
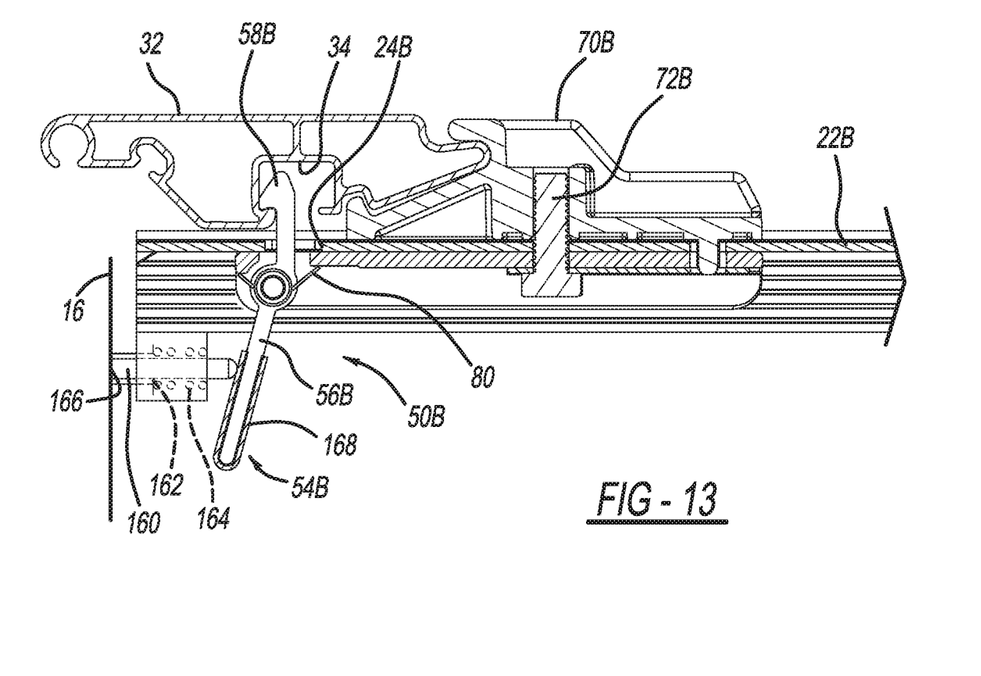
FIG. 13 is a cross-sectional view of a further latch mechanism according to the present teachings in a locked position.

With reference to FIG. 13, the latch mechanism 50B can include a plunger 160 seated within an aperture 162 defined by the second side rail 22B. A spring or other biasing member 164 can be included to bias the plunger 160 in an outward position. At a distal end of the plunger 160 is a tailgate contact 166, at which the plunger 160 contacts the tailgate 16 when the tailgate 16 is closed. Thus when the tailgate 16 is closed as illustrated in FIG. 13, the tailgate 16 contacts the plunger 160 at tailgate contact 166, and pushes the plunger 160 into contact with the lever portion 56B, which may be covered with a cap 168. The plunger 160 pushes against the lever portion 56B to rotate the latch element 54B to the locked position of FIG. 13, in which the latch element 58B latches onto the header 32 as illustrated. When the tailgate 16 is opened, the tailgate 16 will no longer hold the plunger 160 against the lever portion 56B, and spring 164 will move the plunger 160 away from the lever portion 56A. The biasing member 80 will be free to rotate the latch element 54B clockwise from the locked position of FIG. 13 to the unlocked position, and thus automatically unlatch the header 32 at the second rail 22B.

Figure 14:
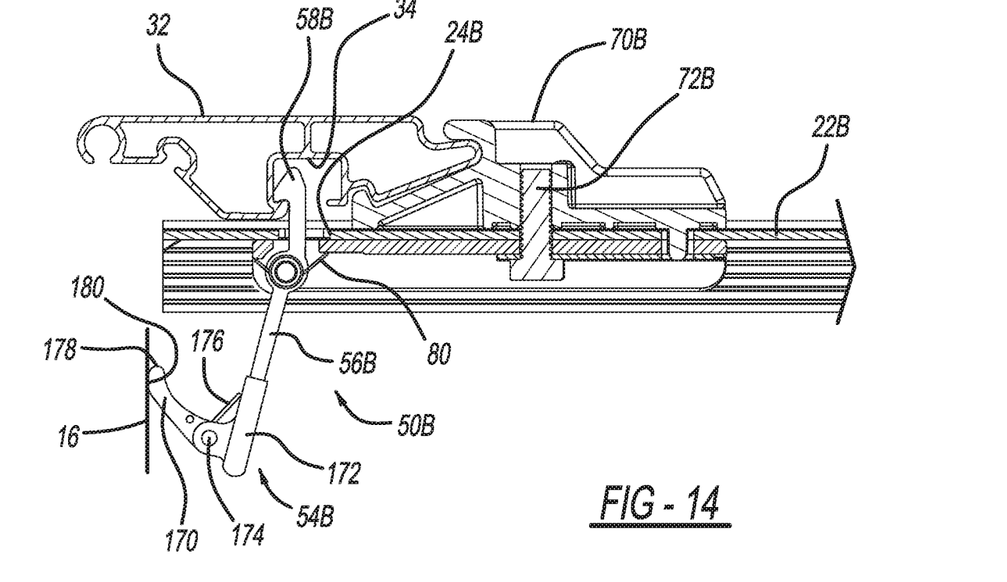
FIG. 14 is a cross-sectional view of another latch mechanism according to the present teachings in a locked position.

With reference to FIG. 14, the latch element 54B can include a flange 170 mounted to the lever portion 56B with a connection or sleeve portion 172. The connection portion 172 can be connected to the lever portion 56B in any suitable manner, such as with any suitable press-fit and/or adhesive. Alternatively, the connection portion 172 may be coextruded with the lever portion 56B. The flange 170 can be pivotally coupled to the connection portion 172, such as with a coupling member at pivot point 174. The flange 170 is biased in an extended position with any suitable biasing member, such as a spring 176. When the tailgate 16 is closed, as illustrated in FIG. 14, the tailgate 16 contacts a distal end 178 of the flange 170, particularly at tailgate contact 180 of the distal end 178. The tailgate 16 can pivot the flange 170 about the pivot point 174, and rotate the latch element 54B to the locked position of FIG. 14, in which the hooked portion 58B locks or clamps onto the header 32. Once the tailgate 16 is opened, the tailgate 16 will no longer contact the flange 170, which will allow the biasing member 80 to rotate the latch element 54B to the unlocked position, in which the hooked portion 58B will no longer hook onto the header 32. The header 32 will thus be unlatched from the second rail 22B, which will allow the tonneau cover 30 to be moved to the open arrangement.

Figure 15:
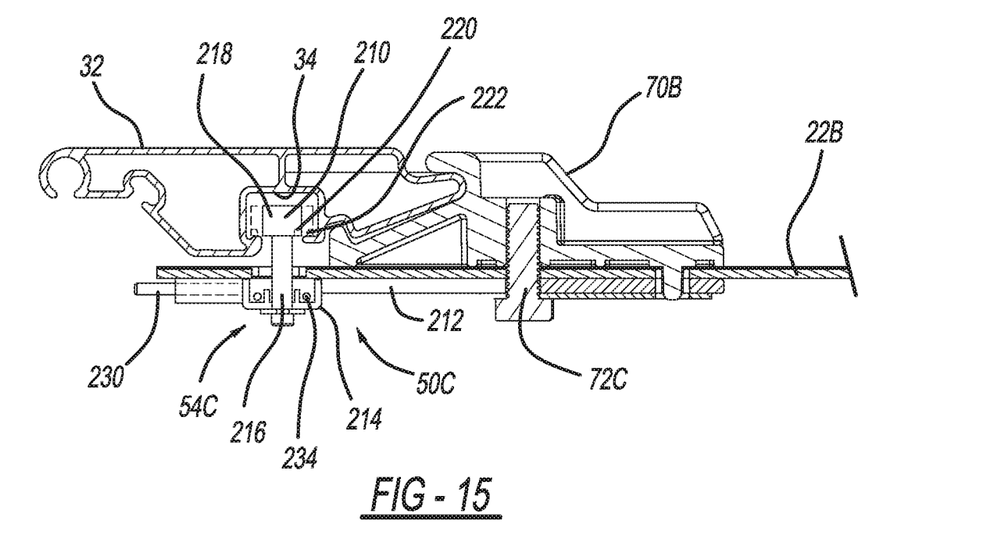
FIG. 15 is a cross-sectional view of yet another latch mechanism according to the present teachings in a locked position.
Figure 16:
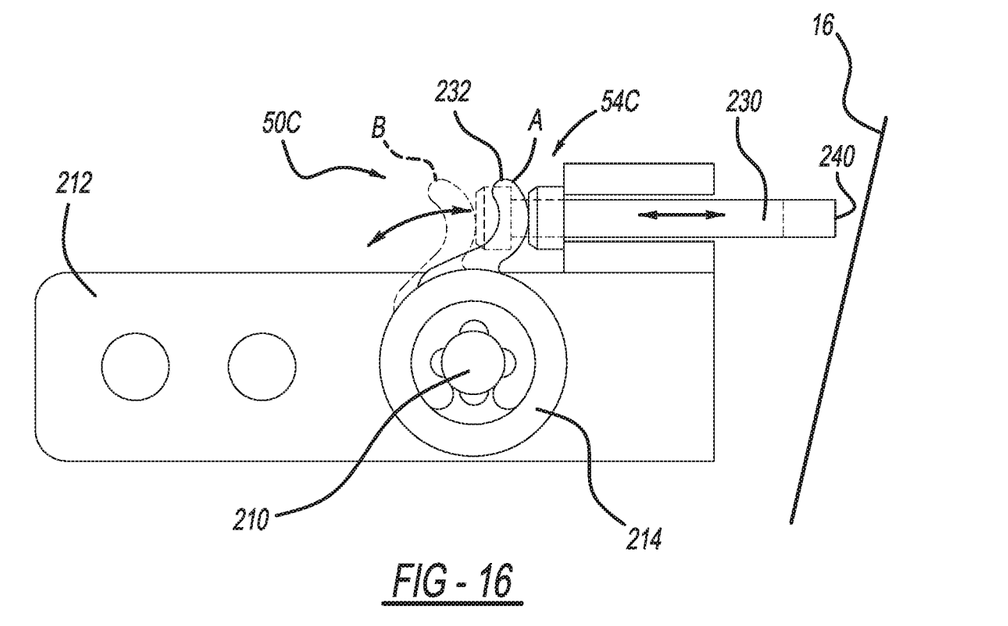
FIG. 16 is a bottom view of the latch mechanism of FIG. 15.
Figure 17:
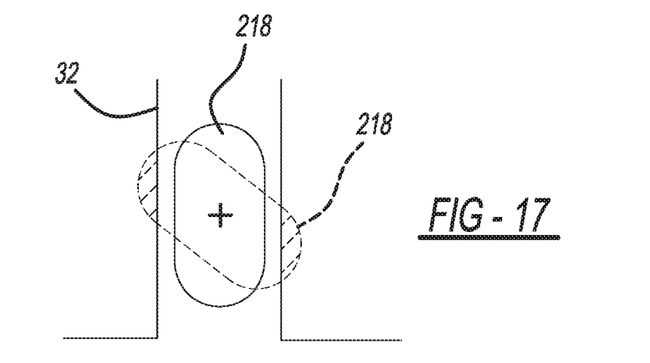
FIG. 17 is a top view of the latch mechanism of FIG. 15.

With reference to FIGS. 15-17, another latch mechanism according to the present teaching is illustrated at reference numeral 50C. The latch mechanism 50C includes a latch element 54C. The latch element 54C generally includes a lock stud 210, which extends through frame 212, and which is connected to an actuator 214 at an undersurface of the frame 212. The frame 212 can be coupled to the second rail 22B in any suitable manner, such as with coupling member 72C, which extends through the frame 212 and through the second rail 22B into cooperation with the header stop 70B.

The lock stud 210 specifically includes a post 216, which is connected to the actuator 214. The post 216 extends through the frame 212 and through the second rail 22B. At an upper end of the post 216 is a head 218. The head 218 includes a cam portion 220, which is configured to mate with a cam surface 222 of the receptacle 34 defined by the header 32.

The latch mechanism 50C further includes a plunger 230, which is slidably mounted proximate to a tab 232 connected to the actuator 214. The plunger 230 can be moved into contact with the tab 232 by the tailgate 16 in order to rotate the actuator 214 and the post 216. Specifically, at a distal end of the plunger 230 is a tailgate contact 240. When the tailgate 16 is moved to the locked position, the tailgate 16 will contact the plunger 230 at tailgate contact surface 240 and slide the plunger 230 against the tab 232. Pushing of the tab 232 rotates the tab 232 to position B, which results in rotation of the actuator 214 and the lock stud 210 connected thereto. As the head 218 of the lock stud 210 rotates, the cam portion 220 of the head 218 contacts the cam surface 222 of the header 32 to pull the header 32 down onto the head 218 and the second rail 22B. When the tailgate 16 is opened, the plunger 230 will no longer be held against the tab 232 by the tailgate. As a result, the actuator 214 is biased by spring 234 to position A, which will rotate the lock stud 210 such that the cam portion 220 of the lock stud 210 no longer engages the cam surface 222 of the header 32. The header 32 can then be lifted off of the lock stud 210 and ultimately the second rail 22B to allow the tonneau cover 30 to be moved to the open arrangement.

Figures 18, 19:
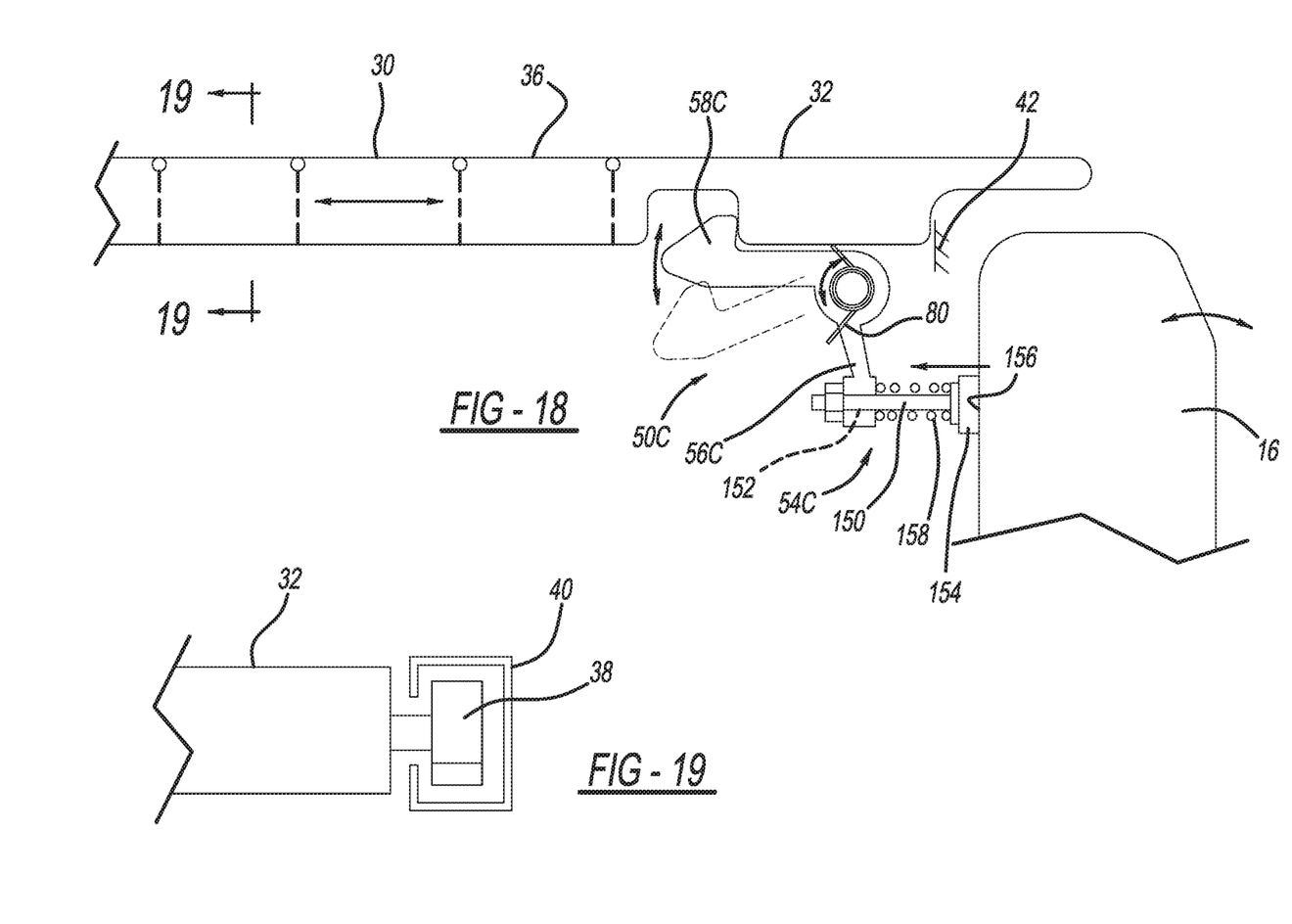
FIG. 18 illustrates another tonneau cover and latch mechanism according to the present teachings.
FIG. 19 is a cross-sectional view taken along line 19-19 of FIG. 18.

FIGS. 18 and 19 illustrate the present teachings as applied to an exemplary retractable tonneau cover 30 including hingeable sections 36. As one skilled in the art will appreciate, to open the retractable tonneau cover 30, the cover 30 is retracted into a canister at front end 20 of the vehicle 12. The cover 30 includes rollers 38 seated in channels 40 (see FIG. 19) at the sidewalls 18A and 18B, which facilitate rolling of the cover 30 across the cargo box 14. In the closed position illustrated in FIG. 18, the retractable tonneau cover 30 is pulled across the cargo box 14 towards the tailgate 16 until the retractable tonneau cover 30 contacts a stop 42 proximate to the tailgate 16 when the tailgate 16 is in a closed position. The stop 42 can be any suitable stop, including any suitable stop surface of the cargo box 14.

In the example of FIG. 18, the present teachings include a latch mechanism 50C including a latch element 54C. The latch element 54C can include plunger 150 received within an aperture 152 of a lever portion 56C. The plunger 150 includes a distal end 154, which is arranged to contact the tailgate 16 at tailgate contact 156 at distal end 154 when the tailgate 16 is closed. Spring 158 biases the plunger 150 in an outward/extended position in order to facilitate contact with the tailgate 16 at the tailgate contact 156. Thus as the tailgate 16 is closed, the tailgate 16 contacts the distal end 154 of the plunger 150 and at least partially compresses the spring 158, which causes the latch element 54C to rotate to the locked position of FIG. 18, in which tab 58C engages header 32 of the retractable tonneau cover 30. When the tailgate 16 is opened, the tailgate will disengage the plunger 150. With the plunger 150 no longer engaged by the tailgate 16, spring 158 will extend the plunger 150 further outward from the lever portion 56C, and biasing member 80 will rotate the latch element 54C from the locked position of FIG. 18 to an unlocked position. In the unlocked position the tab portion 58C will no longer contact the header 32, as illustrated in phantom, which will allow the retractable tonneau cover 30 of FIG. 18 to be retracted. The latch mechanism 50C of FIG. 18 is illustrated for exemplary purposes only. Any of the other latch mechanisms 50B can be used in place of the latch mechanism 50C.

The present teachings thus advantageously provide for a tonneau cover system 10 having a driver's side latch mechanism 50A at a first side rail 22A, and a passenger's side latch mechanism 50B/50C at the second side rail 22B. When the tailgate 16 is opened, the latch mechanisms 50B/50C are automatically moved to their respective unlocked positions as described above. To unlatch the header 32 and move the tonneau cover 30 to an open arrangement, one need only unlatch the driver's side latch mechanism 50A by pulling the lever portion 56A thereof. The present teachings advantageously eliminate any need to walk around the vehicle 12 in order to manually unlatch the latch mechanisms 50B/50C at the passenger's side. Although the present teachings describe the automatic latch mechanisms 50B/50C as being only at the passenger's side, the automatic latch mechanisms 50B/50C may be included at the driver's side as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tonneau cover system for a vehicle having a cargo box and comprising a tailgate movable between an open position and a closed position, the tonneau cover system comprising:
    a tonneau cover mountable to the vehicle and movable between a deployed arrangement wherein the tonneau cover overlies the cargo box and an open arrangement wherein the tonneau cover is opened for allowing access to the cargo box;
    a latch mechanism mountable onto the vehicle and movable between a locked position wherein the latch mechanism secures the tonneau cover in the deployed arrangement and an unlocked position wherein the latch mechanism is released to allow movement of the tonneau cover into the open arrangement, said latch mechanism being biased in the unlocked position and comprising a tailgate contact positionable to engage the tailgate in the closed position to move the latch mechanism from the unlocked position to the locked position; and
    a rail mountable to the vehicle to support the tonneau cover, and wherein the latch mechanism is mounted to the rail.

2. The tonneau cover system of claim 1, wherein the latch mechanism comprises a spring biasing the latch mechanism in the unlocked position.

3. The tonneau cover system of claim 1, wherein the latch mechanism includes a latch element pivotally movable between the unlocked position and the locked position and comprising the tailgate contact.

4. The tonneau cover system of claim 3, wherein the latch element includes a hook portion and a lever portion, the hook portion is positioned to lock onto the tonneau cover when the latch element is in the locked position and the tonneau cover is in the closed position.

5. The tonneau cover system of claim 4, wherein the latch element comprises a pivot point between the hook portion and the lever portion.

6. The tonneau cover system of claim 4, wherein the tailgate contact is mounted to the lever portion and biased by a spring.

7. The tonneau cover system of claim 4, wherein the tailgate contact includes a tab and a spring between the tab and the lever portion, the tab arranged to rotate the latch mechanism to the locked position.

8. The tonneau cover system of claim 4, wherein the latch element includes a flexible tab that constitutes the tailgate contact, the flexible tab extending from the lever portion, the flexible tab is arranged to be flexed by the tailgate when the tailgate is closed to rotate the latch element to the locked position, the flexible tab is mounted to the lever portion.

9. The tonneau cover system of claim 8, wherein the flexible tab is spring biased.

10. The tonneau cover system of claim 4, wherein the tailgate contact comprises a polymeric toggle arranged to be contacted by the tailgate when the tailgate is closed to rotate the latch element to the locked position, the polymeric toggle is between the tailgate and the lever portion when the tailgate is closed.

11. The tonneau cover system of claim 1, wherein the tailgate contact further comprises a plunger arranged to be moved by the tailgate to rotate the latch element to the locked position when the tailgate is closed.

12. The tonneau cover system of claim 11, wherein the plunger is slidably seated in an aperture defined by the lever portion.

13. The tonneau cover system of claim 11, wherein the plunger is slidably seated in an aperture defined by a first side rail of the system extending along a length of the cargo box.

14. The tonneau cover system of claim 4, wherein the tailgate contact comprises a flange rotatably coupled to the lever portion and a spring biasing the flange in an extended position, the flange arranged to be moved by the tailgate when the tailgate is closed to rotate the latch element to the locked position.

15. The tonneau cover system of claim 1, wherein the latch mechanism includes:
a lock stud rotatably movable between the unlocked position and the locked position; and
a plunger movable to rotate the lock stud, the plunger comprising the tailgate contact and arranged to be moved by the tailgate to rotate the lock stud into the locked position.

16. The tonneau cover system of claim 15, wherein the lock stud includes a cam portion that cooperates with a cam surface of the tonneau cover such that rotation of the lock stud when the cam portion is in contact with the cam surface draws the tonneau cover down and onto the lock stud.

17. The tonneau cover system of claim 1, wherein the latch mechanism is mounted to a first side rail of the system extending along a length of the cargo box on a passenger's side of the vehicle opposite to a driver's side of the vehicle.

18. The tonneau cover system of claim 17, wherein the latch mechanism is a first latch mechanism, the system further comprising a second latch mechanism mounted to a second side rail extending along the length of the cargo box on the driver's side of the vehicle, the second latch mechanism configured to be manually actuated from a locked position to an unlocked position.

19. The tonneau cover system of claim 17, wherein: the latch mechanism is a first latch mechanism; and the system further comprises a second latch mechanism mounted to a second side rail of the system extending along the length of the cargo box on the driver's side of the vehicle, the second latch mechanism biased in an unlocked position and movable to a locked position by the tailgate of the vehicle when the tailgate is closed.

20. A tonneau cover system for a vehicle having a cargo box and comprising a tailgate movable between an open position and a closed position, the tonneau cover system comprising:
a tonneau cover mountable to the vehicle and movable between a deployed arrangement wherein the tonneau cover overlies the cargo box and an open arrangement wherein the tonneau cover is opened for allowing access to the cargo box; and
a latch mechanism mountable onto the vehicle and movable between a locked position wherein the latch mechanism secures the tonneau cover in the deployed arrangement and an unlocked position wherein the latch mechanism is released to allow movement of the tonneau cover into the open arrangement, said latch mechanism being biased in the unlocked position and comprising a tailgate contact positionable to engage the tailgate in the closed position to move the latch mechanism from the unlocked position to the locked position;
wherein the latch mechanism includes a latch element pivotally movable between the unlocked position and the locked position and comprising the tailgate contact; and
wherein the latch element includes a hook portion and a lever portion, the hook portion is positioned to lock onto the tonneau cover when the latch element is in the locked position and the tonneau cover is in the closed position.

21. The tonneau cover system of claim 20, wherein the latch element comprises a pivot point between the hook portion and the lever portion.

22. The tonneau cover system of claim 20, wherein the tailgate contact is mounted to the lever portion and biased by a spring.

23. The tonneau cover system of claim 20, wherein the tailgate contact includes a tab and a spring between the tab and the lever portion, the tab arranged to rotate the latch mechanism to the locked position.

24. The tonneau cover system of claim 20, wherein the latch element includes a flexible tab that constitutes the tailgate contact, the flexible tab extending from the lever portion, the flexible tab is arranged to be flexed by the tailgate when the tailgate is closed to rotate the latch element to the locked position, the flexible tab is mounted to the lever portion.

25. The tonneau cover system of claim 24, wherein the flexible tab is spring biased.

26. The tonneau cover system of claim 20, wherein the tailgate contact comprises a polymeric toggle arranged to be contacted by the tailgate when the tailgate is closed to rotate the latch element to the locked position, the polymeric toggle is between the tailgate and the lever portion when the tailgate is closed.

27. A tonneau cover system for a vehicle having a cargo box and comprising a tailgate movable between an open position and a closed position, the tonneau cover system comprising:
a tonneau cover mountable to the vehicle and movable between a deployed arrangement wherein the tonneau cover overlies the cargo box and an open arrangement wherein the tonneau cover is opened for allowing access to the cargo box; and
a latch mechanism mountable onto the vehicle and movable between a locked position wherein the latch mechanism secures the tonneau cover in the deployed arrangement and an unlocked position wherein the latch mechanism is released to allow movement of the tonneau cover into the open arrangement, said latch mechanism being biased in the unlocked position and comprising a tailgate contact positionable to engage the tailgate in the closed position to move the latch mechanism from the unlocked position to the locked position;
wherein the latch mechanism is mounted to a first side rail of the system extending along a length of the cargo box on a passenger's side of the vehicle opposite to a driver's side of the vehicle.

28. The tonneau cover system of claim 27, wherein the latch mechanism is a first latch mechanism, the system further comprising a second latch mechanism mounted to a second side rail extending along the length of the cargo box on the driver's side of the vehicle, the second latch mechanism configured to be manually actuated from a locked position to an unlocked position.

29. The tonneau cover system of claim 27, wherein: the latch mechanism is a first latch mechanism; and the system further comprises a second latch mechanism mounted to a second side rail of the system extending along the length of the cargo box on the driver's side of the vehicle, the second latch mechanism biased in an unlocked position and movable to a locked position by the tailgate of the vehicle when the tailgate is closed.

* * * * *